Figure 1:
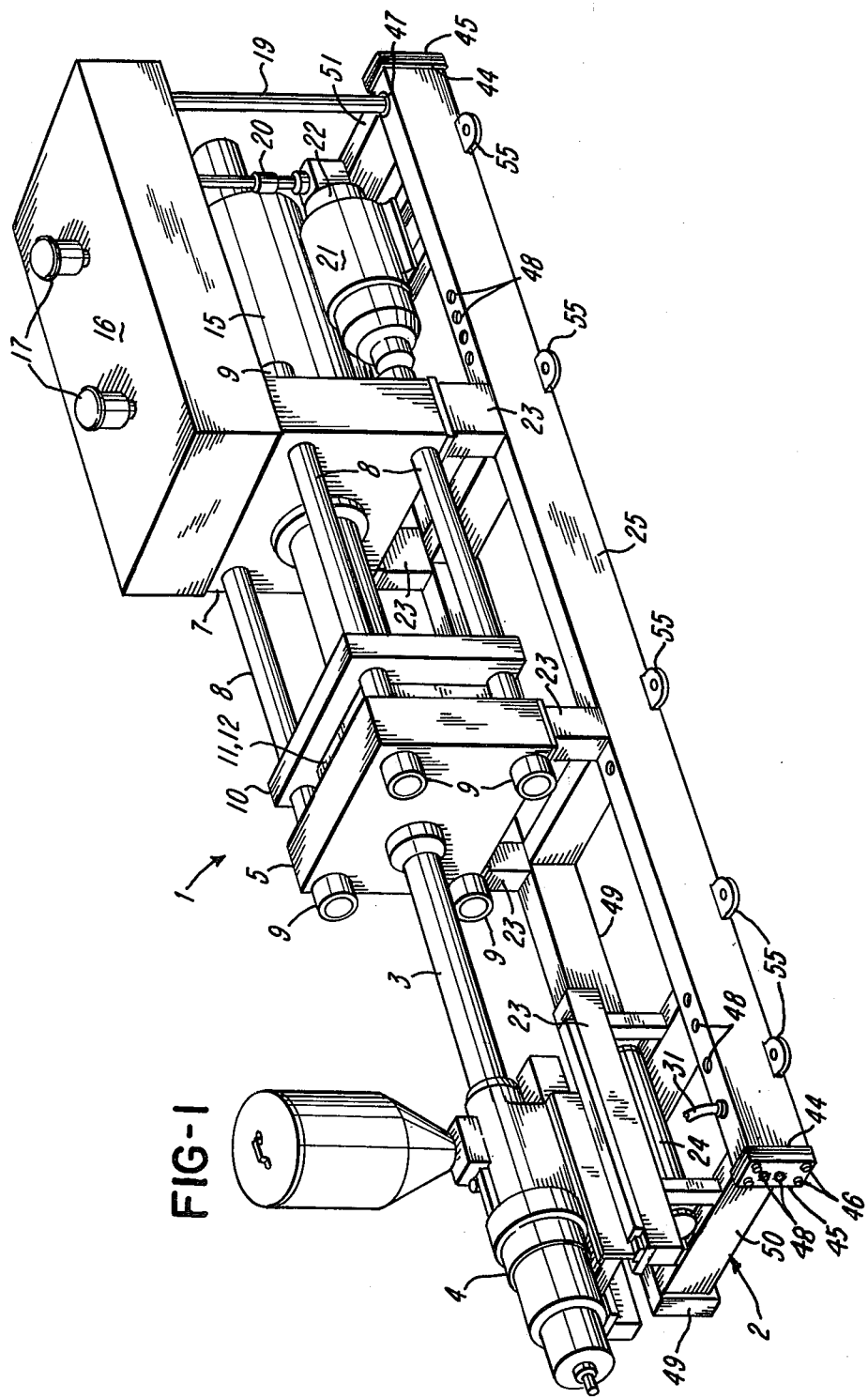

United States Patent [19]

Nash et al.

[11] 4,099,905

[45] Jul. 11, 1978

[54] INJECTION MOLDING MACHINE BASE

[75] Inventors: Myrwin William Nash; John Kenneth Barry; James Gordon Wiatt, all of Cincinnati, Ohio

[73] Assignee: Cincinnati Milacron Inc., Cincinnati, Ohio

[21] Appl. No.: 792,191

[22] Filed: Apr. 29, 1977

[51] Int. Cl.[2] .............................................. B29F 1/00
[52] U.S. Cl. .................................... 425/589; 60/453; 248/19; 425/542
[58] Field of Search .............. 425/542, 591, 589, 586; 60/456, 453, DIG. 10; 248/19

[56] References Cited

U.S. PATENT DOCUMENTS

| 1,380,123 | 5/1921 | Sullivan | 248/19 X |
|---|---|---|---|
| 2,392,203 | 1/1946 | Tucker | 425/586 X |
| 2,802,632 | 8/1957 | Byers | 248/19 |
| 3,791,148 | 2/1974 | Alcock et al. | 60/456 |
| 3,928,969 | 12/1975 | Picker | 60/DIG. 10 X |
| 3,977,189 | 8/1976 | Kubik | 60/453 |

FOREIGN PATENT DOCUMENTS 1,439,212  4/1966  France ............................. 425/451.2

*Primary Examiner*—Francis S. Husar
*Assistant Examiner*—William R. Briggs
*Attorney, Agent, or Firm*—Daniel P. Worth

[57] ABSTRACT

An injection molding machine base has a generally rectangular form having as an integral part thereof a hydraulic return line formed within the base. The return line is straight, has clean-out openings at each end, and no obstructions therein whereby removal of closures at each end exposes the entire cross-section for cleaning. Hydraulic equipment on the machine exhausts directly into this maze. One end of the base has a connection to the hydraulic reservoir for the machine.

2 Claims, 2 Drawing Figures

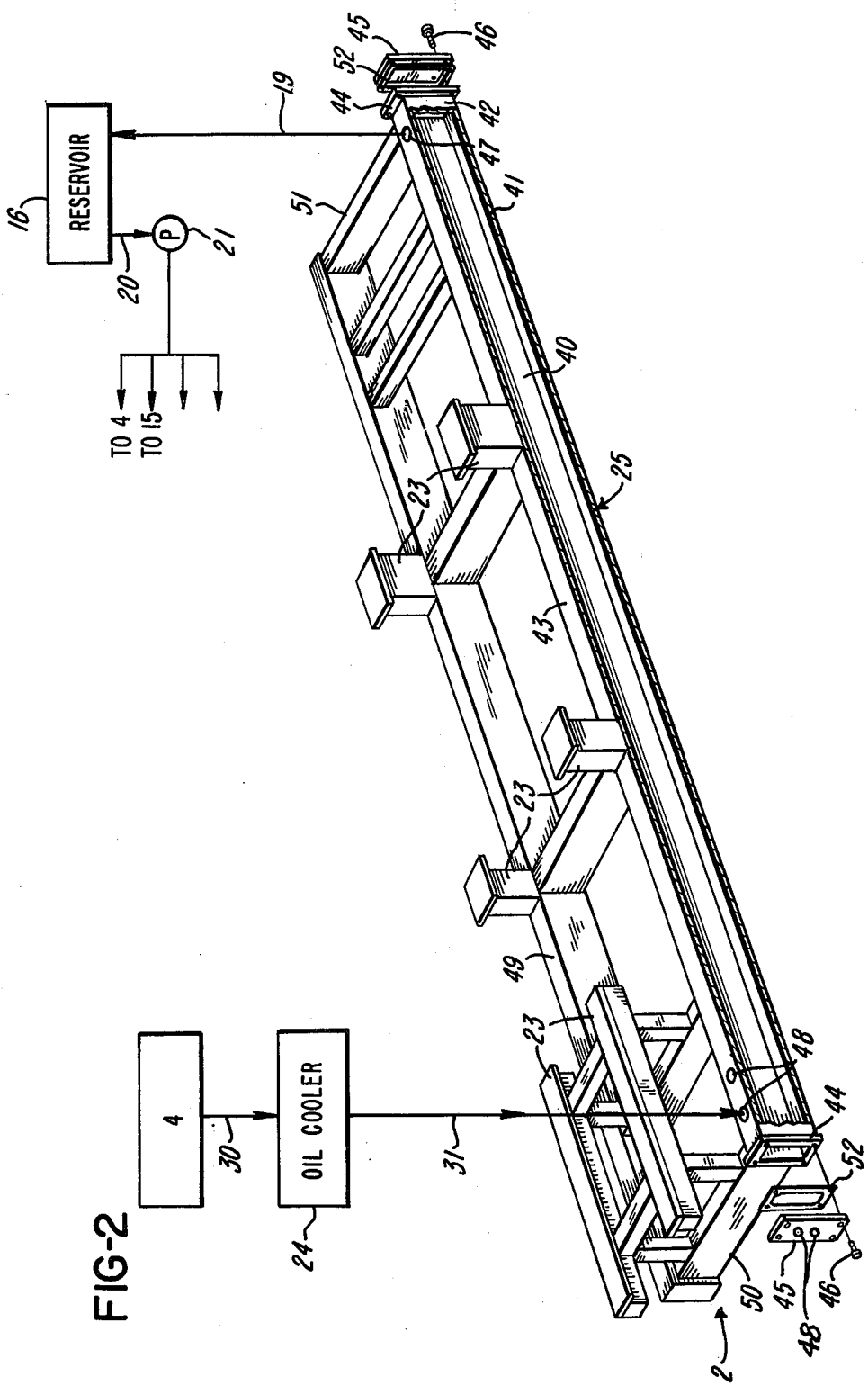

INJECTION MOLDING MACHINE BASE

BACKGROUND OF THE INVENTION

The present invention relates to an improved injection molding machine base. One aspect of the present invention relates to an injection molding machine having an improved machine base. An aspect of the invention is an improved injection molding machine base having as an integral part of the base a return conduit for the hydraulic liquid in the system which is connected to receive the hydraulic exhaust from the equipment on the machine and to convey it back to the reservoir.

Hydraulic injection molding machines for molding plastic are old in the art. These are characterized by the use of a hydraulic liquid to clamp the mold parts together and by the use of hydraulic liquid to drive the plasticating device and to inject the plastic into the mold. The hydraulic liquid is circulated at high pressure and in substantial volume. Commercially available clamping tonnages actually go up to about 5000 tons, meaning that the machine holds together the mold parts with a force of 5000 tons and that the injection force of the plastic trying to force open the mold can equal that 5000 tons.

It is common practice in the construction of hydraulic injection molding machines of this kind to provide individual hydraulic circuits for each hydraulic motor on the machine. Commonly, the hydraulic liquid moves from a reservoir to a pump thence through a hydraulic pump discharge manifold or accumulator to a conduit to the particular prime mover (which may be a piston-and-cylinder, a rotary motor of some kind, or a hydraulic control valve), employed in the prime mover or bypassed around it if the control system so requires on that occasion, then passed into a low pressure return line by which it is conveyed to the reservoir. It is also normal practice to direct a large part of the hydraulic liquid through an oil cooler to hold its temperature within an acceptable range. The conduits have ordinarily been a mix of rigid (i.e. steel) hydraulic tubing and flexible hydraulic hose.

The point is, that prior practice for building injection molding machines provided almost every hydraulic unit on the machine with its individual exhaust line extending from its discharge to an oil cooler and back to the reservoir where it is filtered and whence it is recirculated. The large number of hydraulic conduits and fittings required for such systems has increased the risk of hydraulic liquid leaks; further, the back pressure therein has required additional power consumption.

The present invention reduces the number of individual hydraulic return lines and/or the length thereof by directing each hydraulic discharge into a common return line that is formed in the machine base. This common return line, or manifold, is substantially straight, has no internal obstructions, and can be readily opened at its ends for cleaning. Flexible hydraulic hoses are used whenever possible, especially to connect the prime mover exhaust to the machine base. Advantages realized with the present construction compared with a similar machine using prior art hydraulic systems demonstrates the lower hydraulic pressure and velocity is realized with attendent reduction in wear, noise, oil loss and power consumption, heat, and number of components.

Prior art machinery has generally avoided putting oil conduits in the base, possibly because thermal effects warp the base and disturb machine alignment. Several published designs however have included flow passages or reservoirs in machine bases e.g. U.S. Pat. Nos. 1,716,132; 2,568,783 and 3,977,189. The present invention has not encountered any significant problems from this source.

More particularly, the present invention contemplates a machine base for a hydraulic injection molding machine for molding plastic and resin material in a multiple part mold comprising a generally rectangular body to be placed on a horizontal support surface; a plurality of longitudinally spaced apart mounting pads supported from and above said body for supporting machine elements thereon such as a means to plasticate and inject plastic into a mold cavity, a fixed mold platen to receive part of a mold, and a fixed rear platen for supporting hydraulic clamping means; one of the long sides of said rectangular body being a hollow elongated conduit defined by substantially axially straight walls, a removable closure sealably mounted to each end of said conduit, a large (exit) port through a conduit wall near one end of said conduit, and a plurality of (inlet) ports through said conduit wall and smaller than said large port located between said large port and the other end of said conduit, the passsageway of said conduit being substantially the same size throughout the length thereof whereby removal of both closures exposes said conduit its full length to facilitate cleaning.

Other objects, advantages and features will be realized from the following detailed description of the invention when read in connection with the annexed drawings wherein FIG. 1 is an isometric view of a representative hydraulic injection molding machine including with particularity a machine base according to the present invention; and FIG. 2 is an isometric partially cutaway and exploded view of the machine base alone schematically showing some of the hydraulic piping.

In the Figures is illustrated a hydraulic injection molding machine 1 having a generally rectangular machine base 2 to be placed on the ground, floor or other horizontal support surface. On the base is mounted a plasticating and injection unit 3 having a hydraulic drive 4, a fixed platen 5, a fixed rear platen 7, tie rods (ordinarily four) 8 connecting the aforesaid platens, tie rod nuts 9, a moving platen 10 that slides on the tie rods between the aforesaid fixed platens, two mold parts 11,12 supported respectively on the fixed and moving platens and defining a mold cavity therein which receives plastic from the injection unit, and a hydraulic piston-cylinder assembly 15 mounted on said fixed rear platens for moving and clamping shut said moving platen. The unit is also provided with an oil reservoir 16 having suitable air breathers 17, oil filters, etc. with a return stand pipe 19 connecting it to the machine base 2 and a gravity feed line 20 (FIG. 2) to the inlet of the hydraulic pump 22 which is in turn ordinarily driven by an electric motor 21. A plurality of mounting pads 23 are spaced apart along the machine to support the elements 3–10 above. At the end of the molding machine opposite the reservoir and hydraulic pump is an oil cooler 24.

The arrangement described in the preceding paragraph is old in the art except for the use of the machine base 2 having a return hydraulic line 25 constructed therein.

The return hydraulic line 30 connects the drive 4 to the oil cooler and line 31 connects the cooler to line 25. Various other exhaust lines, e.g. pressure release are connected to 25 but are not illustrated. The use of flexible lines here reduces vibration through the machine with attendant reduction in fittings, joints, noise and leaks.

The machine base 2 itself is constructed as best illustrated in FIG. 2, to have a generally rectangular frame which is preferably made by welding. The hydraulic return conduit 25 or manifold is a longitudinal member located at the rear of the hydraulic machine, i.e. away from the side on which the operator is ordinarily intended to stand and preferably is a seamless fluid tight welded conduit having a rectangular cross-section defined by rectangular walls 40, 41, 42, 43. One end at least has, but preferably at each end of the conduit 25, a flange 44 to which is sealably and removably secured a closure plate 45 or blind flange by means of a plurality of bolts and nuts 46. The conduit 25 is preferably substantially straight and is substantially the same cross-section throughout i.e. is unobstructed, whereby the same may be readily cleaned by removing both closure plates and directing a stream of solvent, a swab, or the like therethrough to clean out sludge, gravity separated deposits, water, etc. which accumulate over a period of time. This keeps the oil cleaner, reduces the load on the filter unit normally found in the reservoir thus increasing filter effectiveness and improves operation of the various components since there is a lower amount of contaminants in the hydraulic liquid.

An exit port 47 from the top side of conduit 25 directs return fluid into standpipe 19. At least one and preferably a plurality of inlet ports 48 admit liquid from the various prime movers — ordinarily drain lines from labrynth or other kinds of seals — and their flexible outlets into conduit 25, through top wall 43 and/or one or both of closures 45. Ports 48 are plugged if not used. The plugs (not shown — but they are conventional pipe plugs) can be removed for quick inspection or partial cleaning or emptying of hollow member 25.

The rest of the machine base consists of a front elongated member 49, generally parallel to conduit 25, and two short end members 50,51. Preferably the machine base is a welded steel assembly and the long and short members 49, 50, 51 have rectangular cross-sections but do not have to be fluid tight.

Gaskets 52 preferably complete the closure-flange assembly.

Mounting bolts and bolt holes are omitted for clarity from the pads 23 as these are well-known in the art. The base 2 does have a plurality of foundation bolt flanges 55 welded external of conduit 25 and, although not shown, of front base member 49.

The invention claimed is:

1. A machine base for a hydraulic injection molding machine for molding plastic and resin material in a multiple part mold comprising a generally rectangular body to be placed on a horizontal support surface, the sides of said rectangular body including a pair of opposed long side members connected together adjacent their ends by opposed short end members;

a plurality of longitudinally spaced apart mounting pads supported from and above said body for supporting machine elements thereon such as means to plasticate and inject plastic into a mold cavity, a fixed mold platen to receive part of a mold, and a fixed rear platen for supporting hydraulic clamping means;

one of the long side members of said rectangular body being a hollow elongated conduit defined by substantially axially straight walls;

a pair of removable closures each one sealably mounted on a respective end of said conduit and being of a size to seal off the entire cross section of said conduit and thus to expose said cross section for cleaning when removed;

an exit port through a conduit wall near one end of said conduit;

at least one inlet port through said conduit wall located between said exit port and at the other end of said conduit;

the passageway defined by said conduit being substantially the same cross section throughout the length thereof.

2. In combination with the injection and mold support components of a hydraulic injection molding machine assembled on a machine base that has a generally rectangular body intended to be placed on a horizontal support surface, the sides of said rectangular body including a pair of opposed long side members connected together adjacent their ends by opposed short end members, a plurality of longitudinally spaced-apart mounting pads on the uppermost side of said machine base body for supporting said components which include at one end of the body a means to plasticate and inject into a mold cavity, a fixed rear platen near the opposite end for supporting a hydraulic mold clamping means, a fixed mold platen to support part of a mold at a position between said means to plasticate and said rear platen, and a movable platen driven by said clamping means between said fixed and rear platens, a hydraulic pump means at that end of said machine base adjacent said fixed rear platen, a hydraulic oil cooler on said base adjacent said means to plasticate with a hydraulic oil reservoir supported at that end of said machine base adjacent and generally above said fixed rear platen, and conduit means connecting in series said pump means to plasticate and oil cooler; the improvement comprising one of the long side members of said rectangular body being a hollow elongated conduit adapted to be placed on a horizontal supporting surface and defined by substantially axially straight walls;

a pair of removable closures each one sealably mounted on a respective end of said conduit and being of a size to seal off the entire cross secton of said conduit and thus to expose said cross section for cleaning when removed;

a return port through said conduit wall near the hydraulic pump end thereof and at least one entry port through said conduit wall located between said return port and the other end of said conduit, the passageway defined by said walls of said conduit being substantially the same cross-section throughout the length thereof;

return lines connected between said entry port and the exhaust portions of said oil cooler and said plasticating means, portions of the hydraulic system; and a stand pipe connecting said reservoir with said large port in said conduit.

* * * * *